Aug. 12, 1941.   C. D. PETERSON   2,252,198
TRANSMISSION GEARING WITH SYNCHRONIZING CLUTCHES
Filed April 11, 1939   2 Sheets-Sheet 2
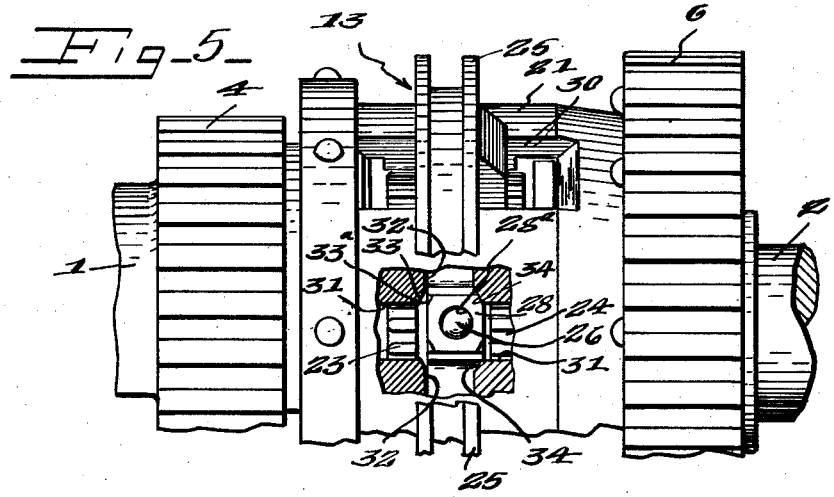
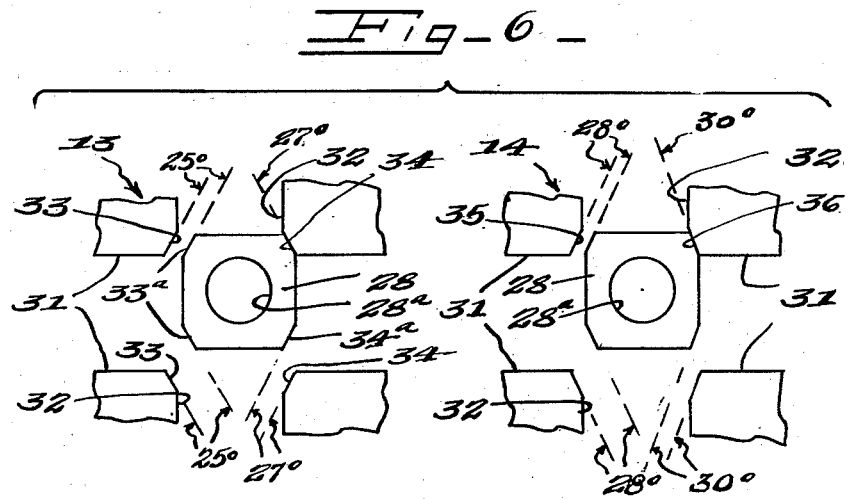
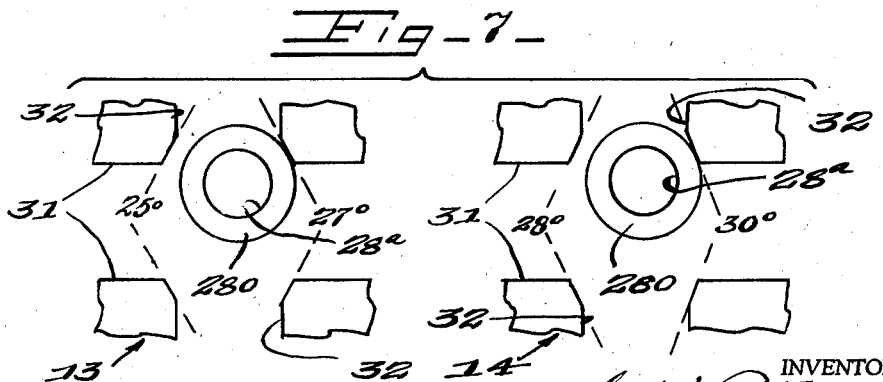

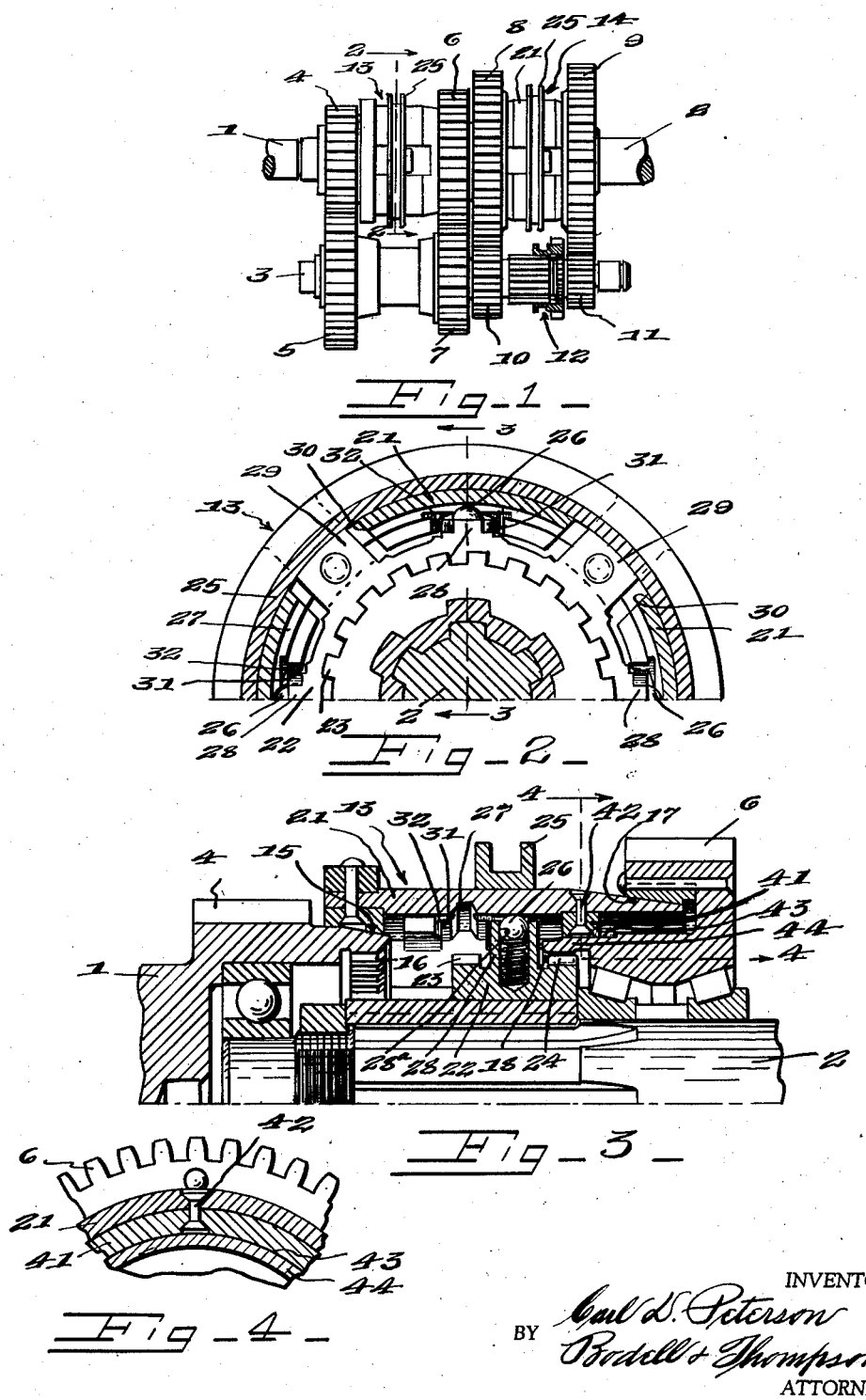

Patented Aug. 12, 1941

2,252,198

UNITED STATES PATENT OFFICE 2,252,198

TRANSMISSION GEARING WITH SYNCHRONIZING CLUTCHES

Carl D. Peterson, Toledo, Ohio

Application April 11, 1939, Serial No. 267,272

5 Claims. (Cl. 192—53)

This invention relates to change-speed transmission gearing having a plurality of synchronizing clutches selectively operable to connect the input and output shafts of the gearing through different gear ratios, and in which clutches the shifting of the toothed section into clutching engagement is blocked by parts coacting with a camming action until synchronization is completed, and has for its object a construction by which the shifting-in operation for the selected gear ratio is effected by a minimum shifting-in force, after synchronization or after the blocking means has been rendered ineffective by the synchronization.

It further has for its object a construction of synchronizing clutch including an outer sleeve friction section and an inner toothed section by which the sleeve section is supported and centered by a single centering ring relatively to the toothed section and to the clutch member with which the sleeve section coacts.

The invention consists in the novel features and in the combinations and constructions hereinafter set forth and claimed.

In describing this invention, reference is had to the accompanying drawings, in which like characters designate corresponding parts in all the views.

Figure 1 is an elevation of a transmission gearing embodying this invention, the gear box being omitted.

Figure 2 is an enlarged fragmentary sectional view on line 2—2, Figure 1.

Figure 3 is a sectional view on line 3—3, Figure 2.

Figure 4 is a fragmentary sectional view on line 4—4, Figure 3.

Figure 5 is an enlarged fragmentary plan view, partly in section, of one of the synchronizing clutches illustrating the coaction of the blocking means.

Figure 6 is a diagrammatic view illustrating the different angles of the blocking means of the two clutches embodied in the transmission.

Figure 7 is a diagrammatic view similar to Figure 6 illustrating a slightly different form of blocking means and utilization of the different cam angles of the two synchronizing clutches.

1 and 2 designate the input and output shafts of the gearing; 3 the counter shaft. 4 is a clutch gear mounted on the input shaft 1 and rotatable therewith and meshing with a gear 5 on the counter shaft. 6 is a gear rotatably mounted on the output shaft 2 and axially spaced from the gear 4, this meshing with a gear 7 rotatable with the counter shaft 4. 8 and 9 are additional gears rotatably mounted about the output shaft 2 and meshing with gears 10 and 11 on the counter shaft. 12 designates a reverse gear mechanism, which is axially shiftable into and out of position to either clutch the gear 11 to the counter shaft or unclutch it and shift the same into mesh with an idler gear, not shown, meshing with the gear 9. The reverse mechanism forms no part of this invention.

13 and 14 designate synchronizing clutches operable to connect the input shaft 1 and output shaft 2 together through different speed ratios, these clutches being substantially alike in construction, with the exception of the differences hereinafter pointed out and forming the subject matter of this invention.

Shifting of the clutch 13 to the left from neutral clutches the shafts 1, 2 together in direct drive relation. Shifting of the clutch 13 to the right from neutral clutches the gear 6 to the output shaft 2, so that the drive is through a gear train as follows: Gears 4, 5, 7 and 6. Shifting of the clutch 14 to the left from neutral clutches the gear 8 to the shaft 2, so that the shaft 2 is now driven through gears 4, 5, 10 and 8. Shifting of the clutch 14 to the right from neutral clutches the gear 9 to the output shaft 2, so that the drive is through gears 4, 5, 11 and 9. During the drive through this gear ratio, the reverse gear clutch 12 is shifted to the right from neutral to clutch the gear 11 to the counter shaft. The gears 5, 7 and 10 are keyed to the counter shaft. When the drive is through reverse gear, the synchronizing clutch 14 is shifted to the right to clutch the gear 9, and the clutch gear 12 shifted to the left from its position shown into engagement with an idler gear. The means by which the shifting of the clutch 14 and the reverse clutch gear 12 is controlled, or their operation and the proper sequence compelled, forms no part of this invention. Whatever gear ratio is selected, one or the other of the synchronizing clutches effect synchronization before complete toothed or jaw clutch engagement is effected.

In this embodiment of the invention, the gears 4 and 6 constitute driving clutch members for the clutch 13, and the gears 8 and 9, driving clutch members for the clutch 14. The clutches 13 and 14 transmit the driving force to the output shaft 2. The gear 4, which is usually formed integral with the input shaft, is formed with a conical friction face 15 and with a toothed or jaw face 16, and the gear 6 is formed with an internal friction clutch face 17 and an internal toothed or jaw clutch face 18. The gears 8 and 9 are formed with corresponding friction and toothed or jaw clutch faces for coacting with the friction and jaw clutch faces of the clutch 14. The two clutches 13 and 14 are of the construction shown in Figures 2, 3 and 4, with the exception that the friction section of the clutch 14 has external conical friction faces at both ends for coacting with internal conical friction faces of the gears 8 and 9 instead of having an internal conical friction clutch face at one end for coacting with an external clutch face on one of the gears. In Figure 3, in which the clutch is illustrated, the sleeve section has an internal friction clutch face at its left hand end for coacting with an external conical clutch face on the gear 4.

Referring particularly to Figures 2, 3 and 4, each clutch member 13 or 14 comprises an outer friction section 21 and an inner toothed clutch section 22, the outer clutch section 22 having conical friction faces at its opposite ends for coacting with complemental clutch faces 15 and 17 on the gears 4 and 6, and the inner section 22 having external jaws or teeth 23 and 24 on opposite sides thereof for coacting respectively with the clutch teeth 16 and 18 of the gears 4 and 6. The clutch section 22 is mounted on the output shaft 2 to rotate therewith. The sleeve section of the clutch 14 is of the same construction, except that it, as before stated, has external conical clutch faces on both ends coacting with internal clutch faces on the gears 6, 8. The clutch 13 or 14 is shifted by a shifting force applied to the toothed section 22, as through a shifting collar 25 and the shifting force of the toothed section is yieldingly transmitted to the sleeve 21 through yielding coupling means which yield when sufficient shifting force is applied to the collar 25. The yielding coupling means here shown are radially spring-pressed plungers or balls 26 carried by the toothed section 22 and coacting with the inclined walls of the internal notch or groove 27 formed in the sleeve.

In the clutch here illustrated, the inner section 22 is formed with radially extending posts 28 formed with bores 28ᵃ in which the spring-pressed plungers are located, these posts terminating close to the inner peripheral surface of the sleeve 21. The inner section 22 is connected to the shifting collar 25 by means of radial projections 29 extending through slots 30 in the sleeve section 21. The slots 30 are of greater width than the projections 29 and permit relative rotary movement of the sleeve section 21 of the toothed section 22, within limits. The posts 28 also extend into slots 31 in the sleeve and cooperate with the sleeve to block final shifting of the toothed section 22 until the speeds are synchronized. The slots 31 extend lengthwise of the sleeve section 21 or parallel to the axis of the shaft 2 and these slots are formed with notches 32 on opposite sides of the central portion thereof. The posts are of such width as to, at least, slidably fit the slots 31, and hence engage one end wall or the other of one of the notches 32 when out of alinement with the slots 31, as seen in Figures 5, 6 and 7, and coact with such end wall with a camming action. Hence the posts are usually referred to as cam posts. The notches 27 are provided by forming the sleeve with an internal circumferential groove. The slots 31 are internal grooves and the notches 30 intersect the groove 27.

In Figures 6 and 7, the cam posts 28 are shown as square and coact at their corners with the end wall 33 or 34 of one or the other of the notches 32 with a camming action. The cam coacts with the end wall 33 of either of the notches 32 when the clutch 13 is being shifted to the left from neutral to connect the input and output shafts 1, 2 in direct drive relation, and into coaction with the end wall 34 when the clutch 13 is shifted to connect the shafts 1, 2 into indirect drive relation through the train of gears 4, 5, 7 and 6. When the shift is being made, say to the right, the friction and toothed clutch sections 21 and 22 are shifted as a unit and the friction face at the right end of the sleeve 21 engages the friction face of the gear 6 and through a braking action commences to synchronize the speeds of the shaft 2 and the gear 6, and during this movement, relative rotary movement of the sections 21, 22 takes place an amount limited by the difference in widths of the passages 30 and the projections 29. This relative rotary movement brings the cam post 28 into one or the other of the notches 32, and hence blocks further shifting-in of the clutch section 22 by reason of the fact that the cam posts will engage the end wall 34 of one or the other of the notches 32. When the speeds have been synchronized, the relative rotary force is discontinued and hence final shifting of the inner section may be effected and the post 28 alined with the slot 31.

In order that the final shifting-in, after synchronization, may be effected with a minimum force, but at the same time, enough blocking effect may be provided for the particular gear ratio, both the end walls 34 and the corners 34ᵃ of the posts 28 are chamfered or beveled. Likewise, the end walls corners at 33 are beveled and control the blocking and final shifting-in when the shift is made to the left from neutral to clutch the output shaft 2 to the gear 4. In order that each final shifting-in may be made with a minimum force, and at the same time with sufficient blocking effect for the selected gear ratio, the end walls 33 and 34 are of different bevel or different cam angle. The end wall 33 is here shown as a 25° angle and also the corner 33ᵃ of the cam post of a 25° angle, and the angle of the end wall 34 and likewise the coacting corner 34ᵃ of the cam post, of a 27° angle, each cam angle being such as to require the minimum shifting-in force and provide sufficient blocking-out force. The clutch 14 is also similarly formed but with different cam angles at 35 and 36 from the angles at 33 and 34 of the clutch 13. These angles at 35 and 36 are here shown as 28° and 30° respectively, and sufficient to require a minimum force for shifting-in of the clutch 14 into final engaged position after synchronization, through the friction or sleeve section of the clutch 14, but of enough incline to block final shifting-in until synchronization is effected. The cam angles of the two clutches 13 and 14 thus differ from each other, and also the cam angles of each clutch 13 or 14 used when the shift is being made in one direction from neutral, differ from the cam angles utilized when the shift is being made in the opposite direction from neutral. The cam angles are such that the final shifting-in into toothed clutch engagement, after synchronization, is made with minimum effort to the shifting collar 25 but at the same time sufficiently abrupt to prevent final shifting-in until complete synchronization.

In Figure 7, the cam posts 28ᵇ are shown as circular instead of square with beveled corners, as in Figure 6, or are shown as symmetrical but coact with cam surfaces of different angles on the end walls of the notches 32 in which they work.

As the friction section 21 is supported on the inner toothed section 22 over a small area located centrally of the sleeve 21, here shown as by the plungers 26 acting on the inclined walls of the notches 27, additional means is provided for centering and supporting the sleeve section 21. This means consists of a single internal centering surface or ring on the sleeve 21 located midway between the central portion of the sleeve where it is engaged by the plungers 26, and one end portion, and coacts with a peripheral bearing surface on one of the clutch members or gears with which the synchronizing clutch coacts. As seen in Figures 3 and 4, 41 designates the centering ring secured as by fastening members 42 to the sleeve 21 on the inner face thereof and coacting with the peripheral bearing face at 43 on the hub 44 of the gear 6.

By this construction, the sleeve 21 is held supported and centered without providing a centering ring on the opposite side of the inner clutch member 22 or without providing a bearing surface for the sleeve 21 near both ends thereof and the clutch located in a minimum axial space between the gears 4, 6 or 8, 9.

The clutches may be selected and shifted by any suitable selecting and shifting mechanism.

In operation, the shifting force is applied to the collar 25 in one direction or the other in accordance with the selected gear ratio, as for instance, to the right, and thus the friction section 21 and toothed section 22 are shifted as a unit by reason of the yielding interlocking engagement of the plungers or balls 26 in the notch 27. This shifting brings the friction face at the right end of the sleeve 21 into engagement with the friction face of the gear 6 and also brings the cam posts 28 or 280 into the position shown in Figures 6 and 7 relatively to the notches 32. If, before the synchronization is effected through the friction clutch section 21, and excessive force is applied, final shifting-in of the toothed clutch section 22 is prevented by reason of the engagement of the cam posts 28 with the end walls 34 of the notches 32. When, however, the speeds have been synchronized through the friction section 21, there is no relative rotary movement or relative rotary force between the sleeve section 21 and the cam post 28, and hence force applied to the collar 25 causes the cam post 28 to aline with the slot 31 with a minimum of such shifting force. The cam angles at 33, 34 or 35, 36 are of such a degree that the final shifting-in may be accomplished with a minimum shifting-in pressure for the selected gear ratio. During the final shifting-in, the spring-pressed plungers 26 are cammed out of their notches 27, as shown in Figure 3.

Owing to the construction and cooperation of the cam posts and the unsymmetrical notches with different cam angles on the end walls of each notch and the cam angles of each clutch 13 or 14 differing from the cam angles of the other clutch, the clutches can be shifted into final toothed clutching engagement with a minimum of shifting-in effort for the selected gear ratio.

What I claim is:

1. In a change-speed transmission gearing which includes input and output shafts, a plurality of synchronizing clutches selectively operable for connecting the input and output shafts together through different gear ratios and in which each synchronizing clutch includes a shiftable clutch member comprising a friction section and a toothed section shiftable as a unit in opposite directions from neutral to preliminarily engage the friction section to effect the synchronizing in advance of the shifting in of the toothed section and the toothed section being shiftable axially after synchronization relatively to the friction section, the sections having relative rotary movement, within limits, one of the sections being formed with a lengthwise slot having lateral notches on opposite sides of its central portion, and the other of the sections being formed with projections extending into the notches and being of substantially the same width as the slot to slidably fit the same and normally located in line with the lateral notches, the projections and the ends of the notches being shaped to coact with a camming action; the combination of the coacting cam angle at respective ends of the notches of each clutch being different from the coacting cam angle of the other ends of said notches and the coacting cam angles of the corresponding ends of the notches of the clutches being different from each other, the coacting cam angles for the respective clutches being different for the gear ratios controlled by the clutches and of such angles as to require minimum shifting in force applied against the blocking effect presented by the cam angles during shifting up to a higher or down to a lower ratio.

2. In a change-speed transmission gearing which includes input and output shafts, a plurality of synchronizing clutches selectively operable for connecting the input and output shafts together through different gear ratios and in which each synchronizing clutch includes a shiftable clutch member comprising a friction section and a toothed section shiftable as a unit in opposite directions from neutral to preliminarily engage the friction section to effect the synchronizing in advance of the shifting in of the toothed section and the toothed section being shiftable axially after synchronization relatively to the friction section, the sections having relative rotary movement, within limits, the friction section being a sleeve and the toothed section located within the sleeve, the sleeve being formed with a lengthwise slot having lateral notches on opposite sides of the central portion, the toothed section being provided with posts movable in the slots normally arranged in the notches and slidably fitting the slots, the posts coacting with the end walls of one or the other of the notches with a camming action; the combination of the cam angle of like end walls of the notches of each clutch being of different angularity from the cam angle at the other end of the notches, and the cam angles of the notches of the different clutches being different from each other, the coacting cam angles for the respective clutches being different for the gear ratios controlled by the clutches and of such angles as to require minimum shifting in force applied against the blocking effect presented by the cam angles during shifting up to a higher or down to a lower ratio.

3. In a transmission gearing, the combination of a shaft, clutch members mounted coaxially with the shaft and normally rotatable relatively thereto, and each having a friction clutch face and a toothed clutch face, a third clutch member rotatable with the shaft and located between the former clutch members and shiftable axially in opposite directions from neutral to selectively clutch either of the former clutch members to the shaft, the shiftable clutch member comprising an outer sleeve section having friction faces at its ends for coacting alternately with the friction faces of the former clutch members, and an inner toothed clutch section having sets of clutch teeth on opposite sides thereof for coacting selectively with the clutch teeth of the former clutch members, means for applying shifting force to the toothed clutch section, and yielding means for coupling the sections together, one of the former clutch members having a peripheral surface, and the sleeve section having a single centering surface located between the intermediate part of the sleeve section and the friction clutch face at one end thereof, and coacting with said peripheral surface of one of the clutch members, for supporting and centering the sleeve section.

4. In a transmission gearing, the combination of a shaft, clutch members mounted coaxially with the shaft and normally rotatable relatively thereto, and each having a friction clutch face and a toothed clutch face, a third clutch member rotatable with the shaft and located between the former clutch members and shiftable axially in opposite directions from neutral to selectively clutch either of the former clutch members to the shaft, the shiftable clutch member comprising an outer sleeve section having friction faces at its ends for coacting alternately with the friction faces of the former clutch members, and an inner toothed clutch section having sets of clutch teeth on opposite sides thereof for coacting selectively with the clutch teeth of the former clutch members, means for applying shifting force to the toothed section, and radially movable spring-pressed plungers carried by the inner section and coacting with the intermediate portion of the sleeve section for yieldingly coupling the sections together and tending to support the sleeve section, one of the former clutch members being formed with a peripheral bearing face and the sleeve section being formed with an internal centering ring located between the central portion thereof and the friction clutch face which coacts with the friction face of the clutch member on which said peripheral bearing face is provided, whereby the friction section is supported midway between its ends on the plungers and is supported and held centered by the single centering ring.

5. In a clutch construction, the combination of axially spaced clutch members and an intermediate clutch member shiftable axially in opposite directions from neutral into and out of engagement with the former clutch members, the former clutch members having friction and toothed clutch faces, and the intermediate clutch member comprising an outer sleeve section having friction clutch faces at opposite ends thereof, and an inner toothed section, means for shifting the toothed section and yielding means coupling the sections together, whereby they are initially shiftable axially as a unit, and the inner section is shiftable axially relatively to the sleeve section, when the axial shifting of the sleeve section is stopped, said yielding means including radially spring-pressed plungers carried by the inner section and coacting with a notch having cam-shaped sides on the inner face of the sleeve section and located intermediate of the ends of the sleeve section, a centering ring located between said notch and one end only of the sleeve section, one of the former members having a peripheral bearing surface with which the centering ring coacts in all positions of the intermediate clutch member.

CARL D. PETERSON.